United States Patent [19]
Maige

[11] Patent Number: 4,763,238
[45] Date of Patent: Aug. 9, 1988

[54] EXTENDED OVERLOAD PROTECTION CIRCUIT FOR A SWITCH MODE POWER SUPPLY HAVING CYCLE DETECTOR, MEMORY AND FLIP-FLOP INHIBITION

[75] Inventor: Philippe Maige, Syssinet Pariset, France

[73] Assignee: Thomson-CSF, Paris, France

[21] Appl. No.: 32,559

[22] Filed: Apr. 1, 1987

[30] Foreign Application Priority Data

Apr. 4, 1986 [FR] France ................................. 86 04855

[51] Int. Cl.⁴ ..................... H02M 3/335; H02H 7/122
[52] U.S. Cl. ......................................... 363/21; 363/49; 363/56
[58] Field of Search ...................... 363/21, 56; 361/95, 361/96, 97

[56] References Cited

U.S. PATENT DOCUMENTS

| | | |
|---|---|---|
| 3,733,540 | 5/1973 | Hawkins . |
| 4,288,831 | 9/1981 | Dolikian ................ 361/92 |
| 4,330,816 | 5/1982 | Imazeki et al. ........ 363/56 |
| 4,476,427 | 10/1984 | Kaneko et al. ......... 361/97 |

OTHER PUBLICATIONS

Electronic Components and Applications, vol. 2, No. 1, Nov. 1979, pp. 31–48, Eindhoven, NL; H. Houkes: "TDA1060—A Comprehensive Integrated Control Circuit for SMPS".

Primary Examiner—William H. Beha, Jr.
Attorney, Agent, or Firm—Oblon, Fisher, Spivak, McClelland & Maier

[57] ABSTRACT

A protection device for switch mode power supplies includes a main switch controlled by the output signals of a flip-flop. The flip-flop input receives regulation control signals. A first protection circuit supplies priority signals with respect to the regulation signals on the reset input of the flip-flop. The protection device also includes a cycle detector of the first protection circuit, a memory for accumulating at each cycle a value proportional to the duration between a signal of the detector and the set signal associated with the regulation cycle of the following cycle, and inhibiting of the flip-flop when the memory has accumulated a signal higher than a predetermined threshold.

6 Claims, 4 Drawing Sheets

FIG_1

FIG_3

FIG_4

EXTENDED OVERLOAD PROTECTION CIRCUIT FOR A SWITCH MODE POWER SUPPLY HAVING CYCLE DETECTOR, MEMORY AND FLIP-FLOP INHIBITION

BACKGROUND OF THE INVENTION

1. Field of the Invention

The present invention concerns stabilized power supplies known as "switch mode power supplies".

A switch mode supply functions in the following manner: a primary transformer winding receives a current that is, for example, issuing from a rectifying bridge receiving power from the alternating power mains. The current in the transformer is chopped by a switch (for example a power transistor) placed in series with the primary winding.

A control circuit of the transistor establishes periodic square pulses to turn on the transistor. During the square pulse period current passage is authorized; outside of this square pulse period current passage is prohibited.

On one (or several) secondary winding(s) of the transformer, an alternating voltage is thus received. This voltage is rectified and filtered in order to produce a direct voltage that is the output direct voltage of the switch mode supply.

In order to stabilize the value of this direct voltage, the duty cycle of the switch is modified, i.e. the ratio between the conduction duration and the blocking duration in a chopped period.

Figure 1:
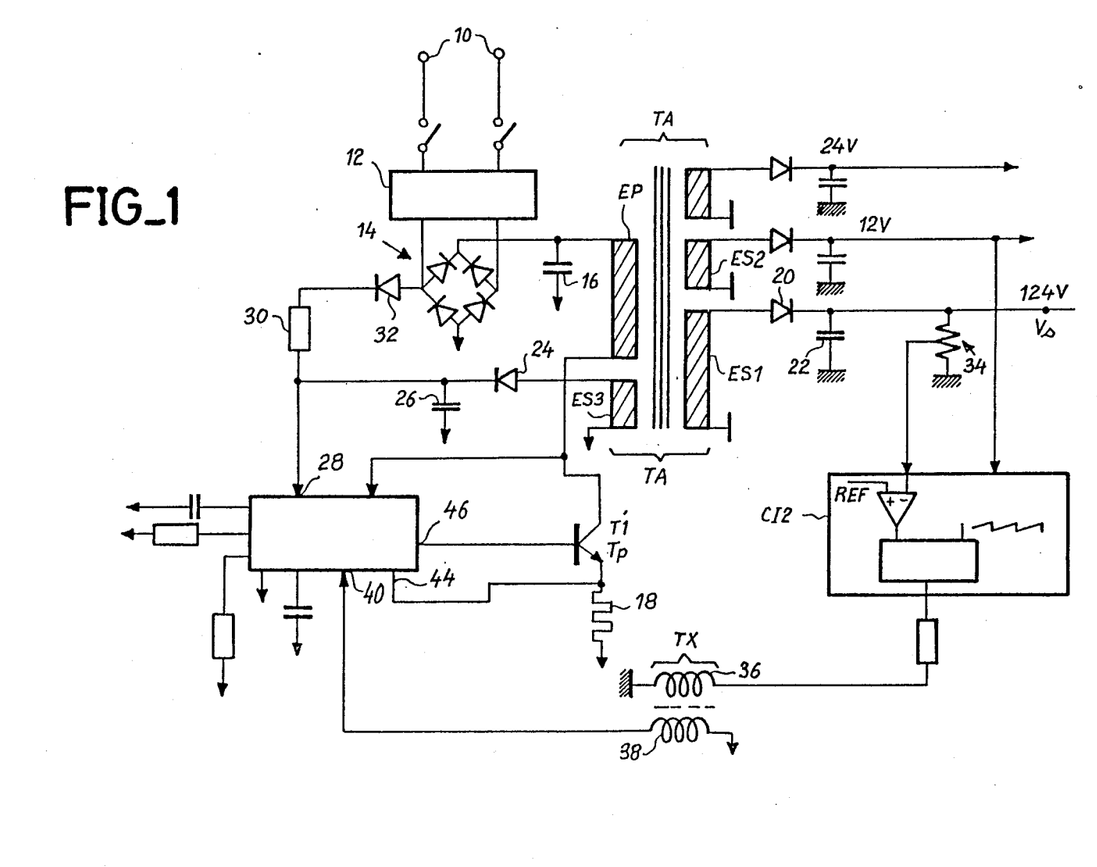
FIGS. 1 and 2 illustrate a switch mode power supply according to the prior art and have been described herein-above.

FIG. 1 represents by way of example a switch mode power structure manufactured by the applicant in which two integrated circuits are used. One of the circuits, CI1, acts to control the base of a power switching transistor $T_p$ for applying thereto periodic control signals for putting under conduction and blocking control. This base control circuit CI1 is placed on the side of the primary winding EP of the transformer TA for reasons which will become apparent from the description given herein-below. The other integrated circuit, regulation circuit CI2, is on the contrary placed on the side of the secondary winding ES1 and is used to examine the output voltage Vs of the power supply in order to produce regulation signals that it transmits to the first integrated circuit through a small transformer TX. The first integrated circuit CI1 uses these regulation signals to modify the duty cycle of conduction of the switching transistor Tp and thus of adjusting the output voltage Vs of the power supply.

FIG. 1 shows the line of the public electric distribution mains under reference 10 (local supply circuit or mains at 110 or 220 volts, 50 or 60 hertz). This line is connected through a filter 12 to the input of a rectifying bridge 14, the output of which is connected on the one hand to a primary electric mass, represented throughout by a black triangle pointing downwards, and on the other hand to one end of the primary winding EP of the supply transformer TA.

A filtering capacitor 16 is placed in parallel on the outputs of the rectifying bridge 14. The other end of the primary winding is connected to the collector of the switching transistor Tp, the emitter of which is connected to the primary mass through a small current measuring resistance 18.

The transformer is provided with several secondary windings that are preferably galvanically insulated from the mains and connected for example to a secondary electric mass galvanically insulated from the primary mass.

In the present description, each of the secondary windings has one end connected to the secondary mass. The other end supplies a respective low-pass filtering capacitor through a respective rectifying diode.

Reference in the following description will be made to a single secondary winding ES1, connected by a diode 20 to a capacitor 22. The direct output voltage of the switch mode supply is the voltage Vs at the terminals of the capacitor 22; but it is well understood that other direct output voltages can be obtained at the terminals of the other filtering capacitors connected to the secondary windings. These output voltages constitute stabilized power supplies for utilization circuits (not represented). By way of example, a secondary winding ES2 supplies a stabilized power voltage of several volts for the regulation integrated circuit CI2 to which reference was made herein-above. It is thus checked that the circuit is not powered and therefore cannot supply signals as long as the switching does not function.

The same is a priori true for the base control integrated circuit CI1 of the power transistor Tp, which circuit is powered by a stabilized voltage supplied from a secondary winding ES3, from a diode 24 and from a capacitor 26 (it will be noted that this winding, although being a secondary winding is connected to the primary ground and not to the secondary mass, this for the very simple reason that the integrated circuit CI1 is necessarily galvanically connected to the primary).

However, as it is necessary to ensure starting of the chopped power supply, it has been foreseen that the power terminal 28 of the integrated circuit CI1 is also directly connected to the mains through a high resistance 30 and a diode 32; this is possible since the integrated circuit CI1 is connected to the primary ground; it is not possible for the circuit CI2 which must remain galvanically insulated from the mains. Once the switch mode power supply functions normally, the stabilized direct voltage issuing from the winding ES3 and from the diode 24 has priority over the voltage issuing from the mains and from the diode 32; this diode 32 is blocked and the direct power supply through the mains no longer intervenes after the initial starting phase.

The role of the integrated circuits CI1 and CI2 will now be defined.

The regulation circuit CI2 receives from a divider bridge 34, placed at the terminals of the capacitor 22, i.e. at the output of the stabilized power supply, data as to the value of the voltage to be stabilized Vs.

This data is compared with a desired value and applied to a pulse width modulator that establishes periodic square pulses having variable width in function of the value of the output voltage Vs; the lower is Vs the larger will be the width of the square pulses.

The square pulses are established at the switching frequency of the switch mode supply. This frequency is thus established on the side of the secondary of the circuit; it is generated either inside the circuit CI2, or outside in a circuit (not shown) in the form of a saw-tooth shaped voltage at the selected switching frequency. This saw-tooth voltage is used in a manner known per se to perform the width modulation.

The variable width square pulses, at the switching frequency, are applied to a primary winding 36 of a small transformer TX, the secondary winding, 38, of which is galvanically insulated from the primary, supplies positive and negative pulses to the rising and descending edges, respectively of the variable width square pulses.

It is these position and frequency pulses determined by the regulation circuit CI2, which constitute regulation signals applied to an input 40 of the base control circuit CI1.

The transformer TX is constituted by several coil turns wound on a ferrite rod, the turns of the primary and the turns of the secondary being sufficiently spaced apart from one another to respect the galvanic insulation standards between primary circuits and secondary circuits of the switch mode supply.

The base control integrated circuit CI1 comprises various inputs among which have been mentioned hereinabove a power input 28 and a regulation signal input 40; a current measuring input 44 connected to the current measuring resistor 18; and an inhibition input allowing to check the magnetization state of a transformer. Furthermore, inputs can be provided to connect the elements (resistors, capacitors) that should form part of the integrated circuit itself but which for technological reasons (of bulk) or for practical reasons (possibilities of adjustment by the user) are externally mounted.

The integrated circuit CI1 furthermore comprises an output 46 which is intended to be connected by a direct galvanic connection to the base of the power transistor Tp. This output supplies square pulses for bringing the transistor Tp to the on or off state.

Figure 2:
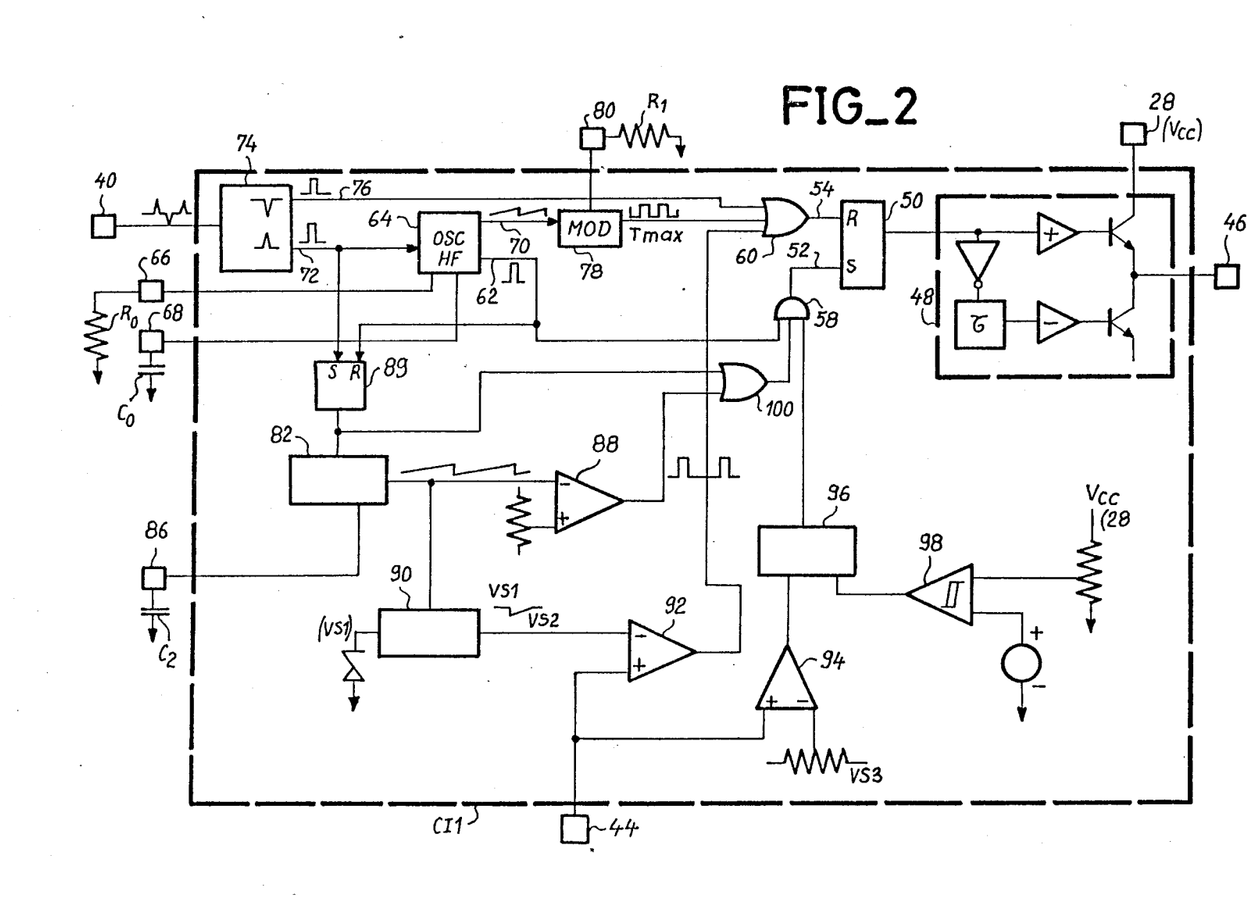

FIG. 2 represents partially the general structure of the integrated circuit CI1.

The output 46 of the circuit, intended for the base control of the transistor Tp, is the output of a push-pull amplification stage designated by the reference 48, this stage preferably comprising two separated amplifiers one of which receives square pulses which are inverted and delayed by several microseconds for to producing to the on state. Such amplifiers are well known.

The signals for switching to the on stae are issued from a logic flip-flop 50 having a set input 52 and a reset input 54. The set input triggers the on state of the power transistor. The reset input triggers the off state.

The set input 52(S) receives the pulses that pass through an AND gate 58, so that the triggering of the on state only occurs when several conditions are simultaneously satisfied; if a single condition is not satisfied, this is sufficient to inhibit the triggering of the on state.

The reset input 54(R) receives the pulses which pass through an OR gate 60, so that the interruption of the on state (after triggering of the on state) occurs once a halt signal is present on one of the inputs of this gate.

On the diagram of FIG. 2, the AND gate 58 has three inputs. One of these inputs receives periodic pulses issuing from an output 62 of a high frequency oscillator 64; the other inputs act to inhibit the transmission of these pulses.

The oscillator defines the switching period of the power supply (20 kilohertz for example). In normal operating state the oscillator 64 is synchronized by the regulation signals. In starting state it is self-oscillating at a free frequency defined by the values of a resistor Ro and of a capacitor Co outside the integrated circuit CI1 and respectively connected to an access terminal 66 and an access terminal 68. The free frequency Fo is as a rule slightly lower than the normal switching frequency.

The oscillator 64 is a relaxation oscillator that produces on an output 70 a saw-tooth, the reset to zero of which is set by the appearance of a positive pulse arriving at the terminal 40. This is the reason why the oscillator 64 is represented with an input connected to an output 72 of a separation and shaping circuit 74 that receives the regulation signals from the terminal 40 and shapes them by separating the positive pulses from the negative pulses. The shaping circuit 74 has two outputs: 72 for the positive pulses, 76 for the negative pulses (the notation of positive pulse and negative pulse will be retained in order to distinguish the triggering pulses for the on state and the triggering pulses for the off state even if the shaping circuit establishes pulses of a single sign on its two outputs 72 and 76).

The oscillator 64 has two outputs; an output 70 supplying a saw-tooth signal and an output 62 supplying a short pulse when the saw-tooth is reset to zero.

A pulse width modulator 78 is connected on the one hand to the output 70 of the oscillator and on the other hand to an adjustable reference voltage through a resistor R1 outside the integrated circuit and connected to an access terminal 80 to the circuit. The modulator 78 supplies periodic square pulses synchronized with the oscillator signals, these square pulses defining a maximal duration of the on state Tmax beyond which the off state of the power transistor must be triggered in any case as a matter of security. These square pulses of modulator 78 are applied to an input of the OR gate 60. The duration Tmax is adjustable through the external resistor R1.

The elements that have been described herein-above ensure the essential of the operating at normal condition of the integrated circuit CI1. The following elements are more specifically provided for controlling the anomalous operating or the starting of the power supply.

A very low frequency oscillator 82 is connected to an external capacitor C2 through an access terminal 86. This external capacitor adjusts the very low oscillation frequency. The frequency can be 1 hertz, for example.

The oscillator 82 is a relaxation oscillator supplying a saw-tooth signal which is applied on the one hand to a threshold comparator 88 which establishes periodic square pulses which are synchronized on the saw-tooth at a low frequency of the oscillator. These square pulses have a brief duration compared to the saw-tooth period. This duration is fixed by the threshold of the comparator 88. It can be for example of 10% of the period. It must be long with respect to the free oscillation period of the high frequency oscillator 64 so that a burst of numerous pulses of the high frequency oscillator can be emitted and utilized during this 10% of the period at very low frequency. This burst defines an attempt at starting during the first part of a starting cycle. It is followed by a pause during the remainder of the period, i.e. during the remaining 90% of the period.

The oscillator 82 only functions for the starting. It is inhibited when the regulation signals appear on the terminal 40 and indicate that the switch mode supply is functioning. This is the reason why an inhibition control of this oscillator has been represented, connected to the output 72 of the shaping circuit 74 through a flip-flop 89 which changes its condition under the effect of the pulses appearing at the output 72. It is returned to its initial condition by the output 62 of the oscillator 64 when there are no more pulses on the output 71.

The saw-tooth signals of the oscillator at very low frequency are furthermore transmitted to a circuit 90 for producing a variable threshold whose function is to establish a threshold signal (current or voltage) having a first value Vs1 in normal operating condition, and a cyclically variable threshold between the first value and a second value at starting condition.

The threshold signal established by the circuit 90 is applied to an input of a comparator 92, the other input of which is connected to the terminal 44 already mentioned, in order to receive on this input a signal that is representative of the amplitude of the current flowing through the power switching device. The output of the comparator 92 is applied to an input of the OR gate 60. It thus triggers the off state of the power transistor Tp, after an on state firing, the off state occuring, when exceeding the threshold (fixed or variable) defined by the circuit 90 has been detected.

Another threshold comparator 94 has an input connected to the current measuring terminal 44 while another input receives a signal representing a third threshold value Vs3. The third value Vs3 corresponds to a current in the switch which is higher than the first value vs1 defined by the circuit 90. The output of the comparator 94 is connected through a latch 96 to an input of the AND gate 58 whereby if the current in the power switch exceeds the third threshold value Vs3, an interruption of the on state of the transistor Tp is not triggered (this interruption is triggered by the comparator 92) but an inhibition of any firing of the transistor. This inhibition lasts until the flip-flop 96 is reset to its initial state corresponding to a normal operating.

As a rule, this return will only occur when the integrated circuit CI1 will have ceased to be normally supplied with power and will be again set under voltage. For example, the return of the latch 96 occurs through a hysteresis threshold comparator 98 which compares one fraction of the power supply voltage Vcc of the circuit (drawn off from the terminal 28) with a reference value and which resets the latch during the first passage of Vcc above this reference after a drop of Vcc below another reference value that is lower than the first one (hysteresis).

Moreover, it can be specified that the output of the flip-flop 89 (which detects the presence of regulation signals on the terminal 40 thus the normal operating of the power supply) is connected to an input of an OR gate 100 which receives on another input the output of the comparator 88 so that the output of the comparator 88 ceases to inhibit the firing of the transistor Tp (inhibition during 90% of the very low frequency cycles) once the operating of the power circuit becomes normal.

OBJECT OF THE INVENTION

Therefore, in the device previously manufactured by the applicant and described in detail herein-above, particular procedures for the starting phases and particular protective procedures in the case of functioning incidents are foreseen.

The present invention aims at further improving the operating safety by detecting operating deficiencies over a longer period of time than was the case with circuits of the prior art. Although the invention presents a novel and distinct contribution with respect to the process of the prior art, the prior device has been described in full detail herein-above in order to render apparent the numerous restrictions which are imposed during production of a novel safety device which must take into account all the possible types of operating foreseen in an already existing circuit without introducing deficiencies or blockages in the normal operating of the circuit in its differnt modes. Consequently, any novel contribution to a complex structure such as that described herein-above requires numerous selections and very numerous attempts between various solutions that could appear a priori as simple must be carried out.

SUMMARY OF THE INVENTION

Therefore, the present invention provides a device for protection against extended overloading in switch mode power supplies comprising a main switch controlled by output signals from a flip-flop of which the inputs for setting to 1 and for resetting to zero receive regulation control signals, a first protection circuit supplying on the input for resetting to zero signals which have priority with respect to the regulation signals when the current in the main switch exceeds a predetermined threshold, further comprising a second protection circuit itself comprising:

means for detecting cycles for which the first protection circuit operates and interrupts the on state of the main switch prior to the arrival of the switching off order of the regulation signal;

memorization means accumulating at each cycle a value proportional to the duration between a signal of the detection means and the setting to 1 signal associated to the regulation signal of the following cycle; and inhibition means for inhibiting the set input of the flip-flop when the memorization means have accumulated a signal higher than a predetermined threshold.

According to one embodiment of the present invention, the detection means comprise a second flip-flop, a third flip-flop and an AND gate:

the second flip-flop receiving at its reset input the output for starting the regulation, the set input of this flip-flop receiving the output of the AND gate and the output of this flip-flop controlling the memorization means;

the third flip-flop having its set input connected to the reset input of the second flip-flop, its reset input connected to the reset signal of the regulation signal, and its output connected to a first input of the AND gate, the second input of the AND gate being connected to the output of the first protection circuit.

According to one embodiment of the present invention, the memorization means comprise a capacitor permanently discharged by discharging means and temporarily charged by charging means only when the detection circuit supplies a signal.

According to another embodiment of the invention, the inhibition means comprise a comparator comparing the signal accumulated by the memorization means with a reference value, the output signal of this comparator inhibiting the set input of the flip-flop when the memorized signal becomes higher than a reference value.

BRIEF DESCRIPTION OF THE DRAWING

These objects, features and advantages and others of the present invention will become apparent from the following embodiment given by way of non-limitative illustration with reference to the appended drawing in which:

FIGS. 5-a to to 5-b are time charts intended to illustrates the functioning of the circuits represented in FIGS. 3 and 4.

DESCRIPTION OF THE PREFERRED EMBODIMENTS

FIG. 3 once again represents in a simplified manner the essential components of the circuit represented in FIG. 2 constituting a protection circuit against the excess currents in the main transistor Tp. The on state in the transistor Tp is normally controlled by a signal available on a terminal 40, resulting from a pulse width modulation circuit which controls a flip-flop 50 through a shaping circuit 74. The flip-flop 50 energizes the base of the power transistor Tp through a preamplification circuit (driver) 48 and an access terminal 46. When the current in the power transistor exceeds a given threshold, the voltage at the terminals of a resistor 18 available at the terminal 44 is compared with a threshold voltage Vs by a comparator 92 and, should this voltage exceed the threshold, the reset input R of the flip-flop 50 is energized through an OR gate 60, the other input of which receives an output signal from the shaping circuit 74.

Figure 3:
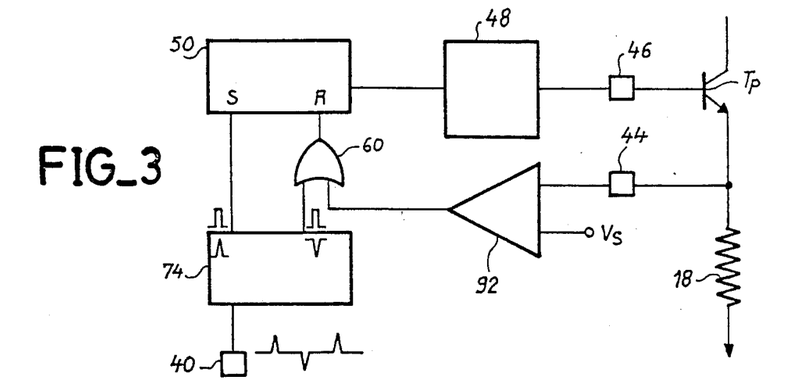
FIG. 3 is a simplified representation of a protection circuit against the overloading of a switch mode power supply according to the prior art.

This protection device effectively protects the switch Tp against a current overloading but does not always allow good protection of the power supply, for example in the case of long duration overloading. In fact, there is no protection against excessive heating of the transformer TA or of the rectifying diodes 20 (cf. FIG. 1) or of other components of the circuit connected to the secondary of the main transformer and it is generally necessary to over-size these components in order to take into account long duration overloadings which could occur as a result, for example, of short-circuiting on the secondary winding.

The invention which will be described herein-below with respect to FIGS. 4 and 5 concerns a device which, added to the conventional current limitation circuit described herein-above, provokes the total and definitive shut down of the power supply in the case of long duration functioning of the current limitation system. Expensive over-sizing of certain components is thus avoided and the operating safety of the power supply is as a whole increased.

The restarting of the power supply can be obtained by the momentary setting out of voltage of the system or at least of the device concerned.

Figure 4:
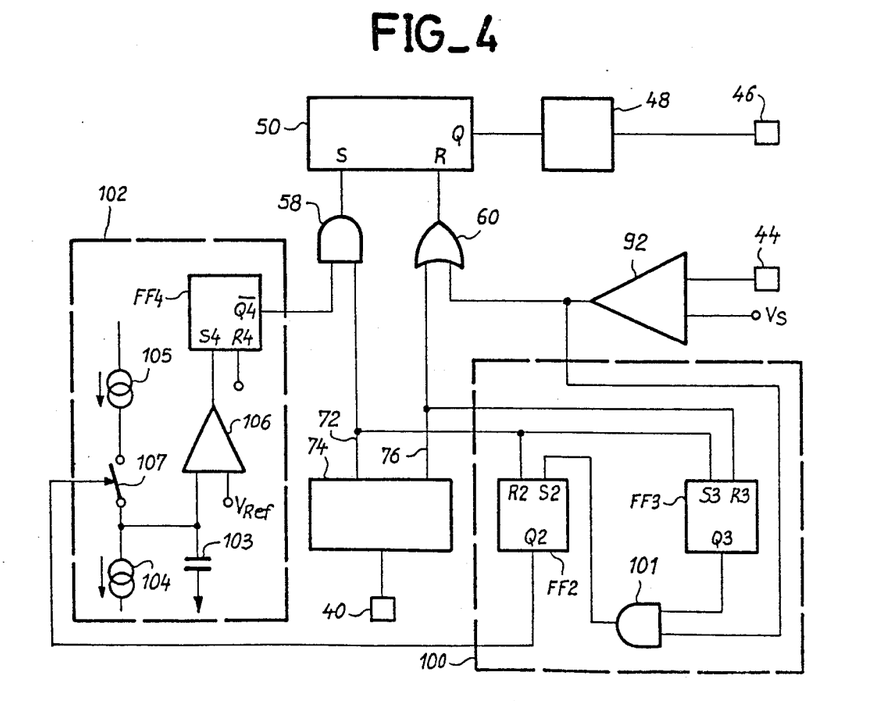
FIG. 4 illustrates the protection circuit against overloads of long duration according to the present invention for switch mode power supplies.
Figure 5A:
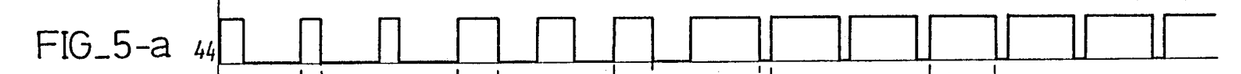
Figure 5B:
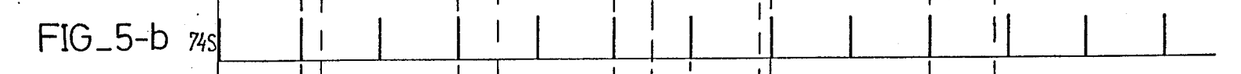
Figure 5C:
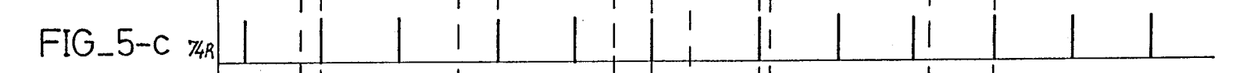
Figure 5D:
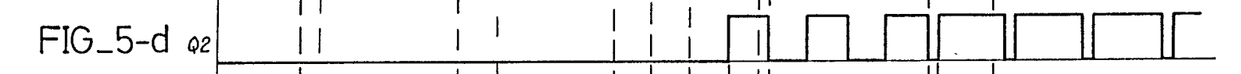
Figure 5E:
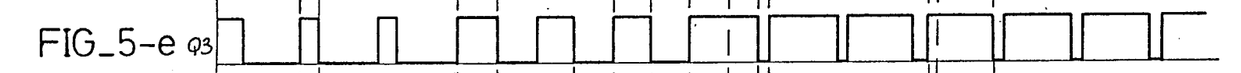
Figure 5F:
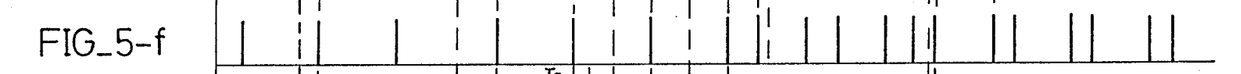
Figure 5G:
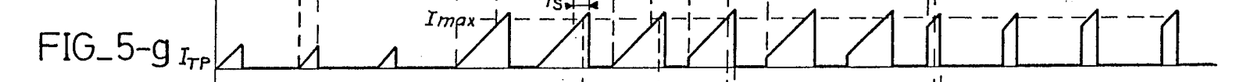
Figure 5H:
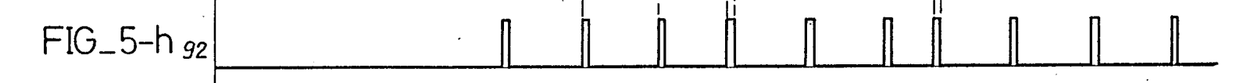

As represented on FIG. 4, the present invention comprises a circuit 100 for detecting the operating of an overload circuit, comprising flip-flops FF2 and FF3 and an AND gate 101, and a circuit 102 for memorization and inhibition of the switch mode power supply. The circuit 102 operates the above described base current control flip-flop 50 through an AND gate 58.

The memorization and inhibition circuit 102 comprises a capacitor 103, a discharge system constituted by a current supply 104 functioning permanently, a system for charging this capacitor constituted by a current supply 105 controlled in all or nothing by a switch 107 receiving the output of the detection circuit 100. When the detection circuit 100 indicates that the current limitation circuit in the power switch Tp does not function, only the discharge system 104 functions and the capacitor 103 remains discharged. When the current limitation system 100 is energized, the charge system (current supply 105) is activated. The ratio between the discharge current and the charge current is selected so that overall the capacitor 103 is charged. When the voltage at the terminals of the capacitor reaches a determined value, fixed by a comparator 106, a flip-flop FF4 is triggered which definitively inhibits the on state of the switch Tp.

In the circuit 100 for detecting the functioning of the current limitation circuit, the flip-flop FF2 has its reset input R2 connected to the output 72 of the form shaping circuit 74, its set input S2 connected to the output of the AND gate 101 and its output Q2 connected to the control terminal of the switch 107 of the circuit 102. The second flip-flop FF3 has its set input S3 connected to the output 72 of the shaping circuit 74, its reset input R3 connected to the output 76 of this shaping circuit and its output Q3 connected to a first input of the AND gate 101 of which the other input is connected to the output of the comparator 92 detecting the excess currents in the power transistor Tp.

FIG. 5 indicates a time chart of the signals appearing in different points of the circuit in four particular operating cases. In FIG. 5 the line a indicates the signals present at the terminal 40 or more exactly the control signals from which result the signals at the terminal 40 following the action of the insulating transformer TX (cf. FIG. 1). Those signals correspond to more or less long square pulses according to the error signal detected;

the line b indicates the signal present at the output 76 of the shaping circuit 74, normally provoking the setting to 1 of the flip-flop 50;

the line c indicates the signal at the output 76 of the shaping circuit 74, normally controlling the reset of the flip-flop 50;

the line d indicates the signal at the output Q2 of the flip-flop FF2 controlling the switch 107;

the line e indicates the signal Q3 at the output of the flip-flop FF3;

the line f indicates the signal at the input R of the flip-flop 50, i.e. the signal at the output of the OR gate 60. This signal corresponds to the rising edge of the pulse at the output 76 of the shaping circuit 74 or at the output of the comparator 92;

the line g indicates the current in the power transistor that corresponds to the signal present on the input 44 of the comparator 92;

the line h indicates the signal at the output of the comparator.

The operating of this circuit in four possible functioning modes will now be studied.

1. Normal operating without overloading

No signal is supplied to the output of the comparator 92 and it is the outputs 72 and 76 (signals of lines b and c) that control the inputs S and R of the flip-flop 50. The circuit 102 not receiving any output signal from the circuit 100 supplies to the output Q4 of the flip-flop FF4 a high level signal and the AND gate 58 is validated thereby allowing the output signal 72 of the shaping circuit 74 to reach the input S of the flip-flop 50.

2. Functioning in lower overloading limit

As shown by line g of FIG. 5, it concerns the case where the reset pulse of the flip-flop 50 tends to bring the switch Tp at the off state prior to an overloading detection (current in Tp higher than I Max) occuring, but where an overloading occurs between the off state order and the effective off state of the power transistor.

This delay is due to the blocking period or storing time $t_s$ of the switch which is not nil in particular in the case where a high voltage bipolar transistor is utilized. The current limitation comparator 92 is thus energized. However, the output signal of the comparator 92 does not reach the flip-flop FF2 to supply an output signal Q2 since the flip-flop FF3 has been previously reset by the signal 76 and blocks the AND gate 101. the flip-flop FF2 thus remains at zero and as in the preceding case, the circuit 102 is not energized and the regulation circuit continues to operate normally. It would in fact be inconvenient to shut down the operating of the chopping power supply in this particular case.

3. Operating in moderate overloading

As in the previous case, it is the output signal 72 of the shaping circuit 74 that provokes the bringing to the on state of the power transistor but, as shown by line g, the overload level of the power transistor Tp is reached prior to the normal off state signal of the transistor (line c) occuring. In this case, the comparator 92 supplies a signal which is transmitted through AND gate 101 enabled by the flip-flop FF3 to the flip-flop Q2 which is set to 1. The switch 107 of the memorization and inhibition circuit 102 is thus closed and the charge process of the capacitor 103 begins.

It will be noted that the signal Q2 (line d) remains at high level until the triggering pulse of the following cycle (bringing of the output 72 at high level). Therefore, the earlier overloading arrives in the cycle, the more the signal Q2 is present during a long period. After several functioning cycles, the voltage accumulated on the capacitor 103 will be higher than the reference voltage VRef applied to the second terminal of the comparator 106. Subsequently, the flip-flop FF4 supplies a signal at low level to its output Q4 and the AND gate 58 invalidates the input S of the flip-flop 50. This occurs only if the overloading lasts over a certain number of cycles. Thus, the functioning of the switch mode power supply is definitively brought to the off state indicating an operating failure of the device, for example a short-circuiting of a secondary winding of the transformer TA (cf. FIG. 1). To start up again the switch mode power supply, it is necessary to apply a new signal to the input R4 of the flip-flop FF4. This input can for example be connected to an initialization device when the whole of the switch mode power supply is powered.

4. Operating under strong overloading

This operating mode is illustrated on the right side of FIG. 5. It is as a whole identical to the case of a moderate overloading but it has been represented only to show the elongation of the pulses Q2 when the overloading occurs very early in an operating cycle of the switch mode power supply.

The various advantages of the present invention thus become apparent. On the one hand; the operating delay time is easily programmable by means of a single component, for example the value of the capacity of the capacitor 103. On the other hand, automatically, due to the elongation of the pulse Q2 when the overloading occurs early in a cycle, the action delay is modulated in function of the intensity of the overloading. Therefore, the greater is the overloading, the shorter is the operating delay time.

Another advantage lies in the perfect simultaneity of the triggering of the timing of the device according to the invention and of the operating of the conventional limitation of the current as described in the description of the prior art. This results in very good operating security. The risk of spurious triggering of the device close to the lower current limit is thus prevented.

On the other hand, as has been seen, the device according to the invention operates well with a power switch constituted by a bipolar transistor in which the storage time is relatively long, but this circuit is perfectly adaptable to a switch of which the off state delay tends towards zero such as a MOS power transistor.

Similarly, accordng to another advantage of the invention, this circuit is perfectly compatible with the other protection and starting assistance circuits which utilized the circuits according to the prior art. Indeed, it will be noted that the components of the circuit according to the invention are perfectly compatible with the components of the current limitation circuit described herein-above. Furthermore, the AND gate 58 that has the circuit at the off state when it is not operating bears the same reference as the AND gate 58 described in relation with FIG. 2. In fact, it can be the same gate comprising simply a supplementary input. Herein lies another advantage of the invention, i.e. it is perfectly compatible with the automatic starting circuit described in relation with FIGS. 1 and 2. In this automatic starting mode, which may be called burst mode, it is also desired to be able to detect and stop the power supply in the case of overloading. However, as mentioned hereinabove in the initial burst method, the circuit operates only with a duty cycle of about 10%. In this case, the capacitor 103 risks to be insufficiently charged during this brief action period and to discharge during the 90% of non-operating. To overcome this, it is foreseen according to the present invention to inhibit the discharging of the capacitor 103 by providing a controlled switch (not represented) in series with the discharge current supply 104 and energized by a signal indicative of the fact that operating is taking place in the burst mode. Therefore, in the case of overloading in the burst method, the capacitor is charged a little at each burst and retains its voltage between the bursts. It is therefore possible to reach the voltage VRef after a certain number of burst.

What is claimed is:

1. A device for protection against long duration overloading in switch mode power supplies comprising a main switch controlled by output signals from a first flip-flop, the set and reset inputs of which receive regulation control signals, a first protection circuit supplying on the reset input priority signals with respect to the regulation signals when the current in the main switch exceeds a predetermined threshold, further comprising a second protection circuit itself comprising:

means for detecting cycles for which the first protection circuit is active and interrupts the on state of the main switch prior to the arrival of the order for the off state of the regulation signal;

memorization means accumulating at each cycle a value proportional to the duration between a signal from the detection means and the set signal associated with the regulation signal of the following cycle; and inhibition means for inhibiting the set input of the flip-flop when the memorization means has accumulated a signal higher than a predetermined threshold;

wherein the means for detecting includes a second flip-flop, a third flip-flop and an AND gate, the second flip-flop receiving at its reset input the starting output of the regulation signal, the set input of the second flip-flop receiving the output of the AND gate and the output of the second flip-flop controlling the memorization means; the third flip-flop having its set input connected to the reset input of the second flip-flop, the reset input of the third flip-flop connected to the reset regulation signal and the output of the third flip-flop connected to a first input of the AND gate; the second input of the AND gate being connected to the output of the first protection circuit.

2. A device for protection according to claim 1, wherein the memorization means comprise a capacitor permanently discharged by a discharging means and temporarily charged by a charging means only when the detection means supplies a signal.

3. A device for protection according to claim 2, wherein the charge and discharge means are current supplies and the charge current supply is connected to the capacitor through a controlled switch actuated by the output of the second flip-flop of the detection means.

4. A device for protection according to claim 1, wherein the inhibition means comprise a comparator comparing the signal accumulated by the memorization means with a reference value, the output signal of this comparator inhibiting the set input of the first flip-flop when the memorized signal becomes higher than a reference value.

5. A device for protection according to claim 4, wherein the output of said comparator is connected to the set input of a fourth flip-flop of which the output is connected to the set input of the first flip-flop through an AND gate of which the other input receives the sginal for triggering the regulation signal.

6. A device for protection according to claim 5, wherein the AND gate connected to the validation input of the first flip-flop receives other inhibition signals issuing from other switch mode power circuits, such as automatic starting control circuits.

* * * * *